June 21, 1949.  P. J. McCULLOUGH  2,473,719
AUTOMATIC TOASTER
Original Filed May 12, 1943
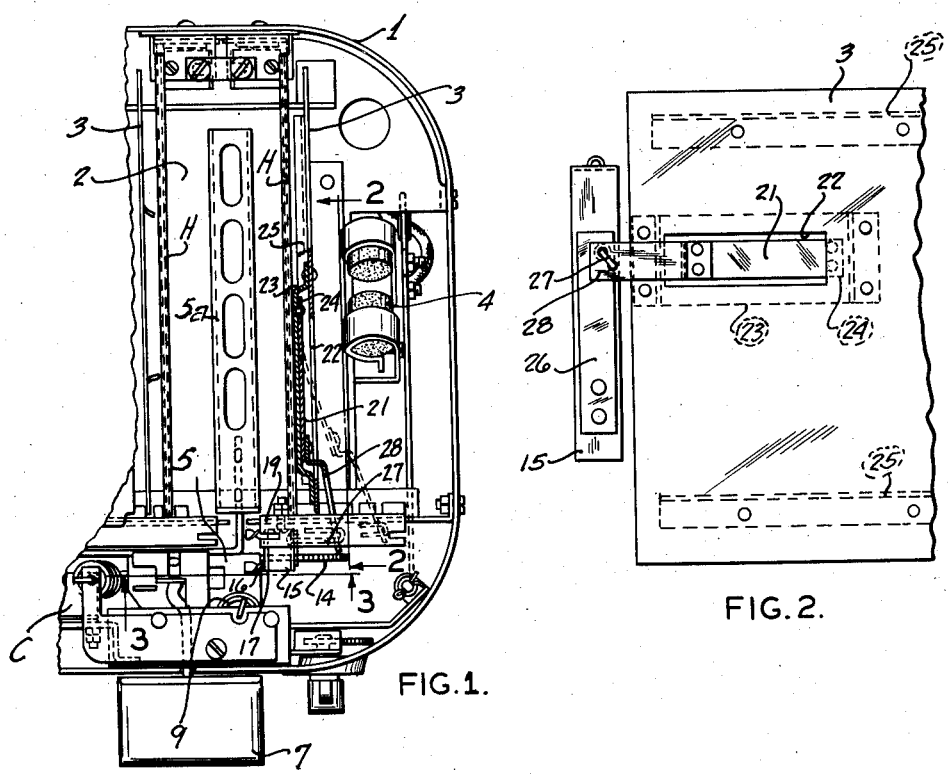
FIG. 1.
FIG. 2.
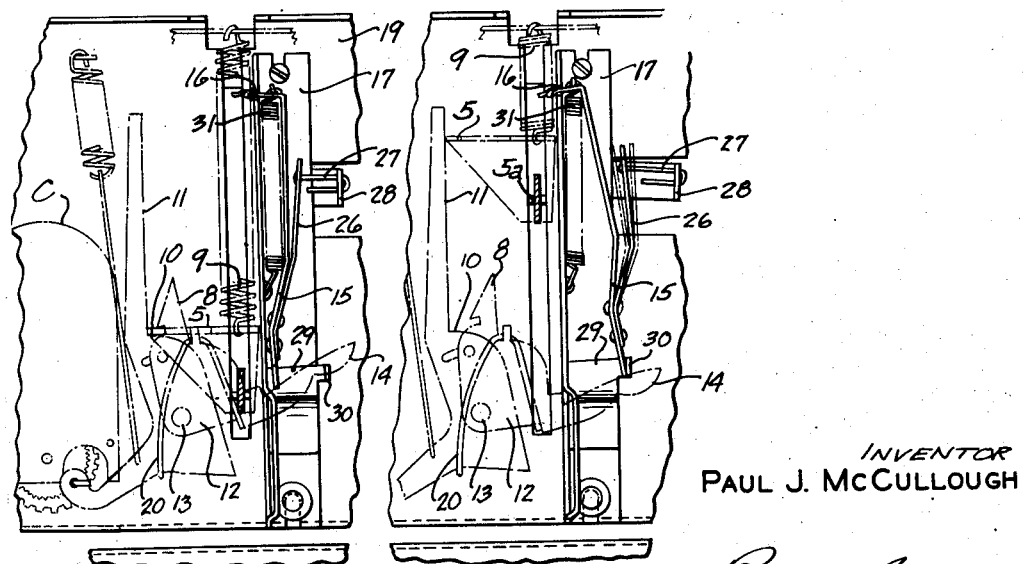
FIG. 3.  FIG. 4.
INVENTOR
PAUL J. McCULLOUGH
By Rodney Bedell
ATTORNEY Patented June 21, 1949

2,473,719

UNITED STATES PATENT OFFICE 2,473,719

AUTOMATIC TOASTER

Paul J. McCullough, St. Louis, Mo., assignor, by mesne assignments, to The Toastswell Company, Incorporated, St. Louis, Mo., a corporation of Missouri Original application May 12, 1943, Serial No. 486,641. Divided and this application November 23, 1945, Serial No. 630,487

4 Claims. (Cl. 219—19)

1

The invention relates to automatic electric toasters of the general type illustrated and described in Patent No. 2,253,637, issued to the present applicant August 26, 1941, and consists in all the novel features of a construction referred to below. This application is a division of a copending application Serial No. 486,641, filed May 12, 1943, now Patent No. 2,404,976, issued July 30, 1946, to the present applicant jointly with Charles H. Steuber.

The general object of the invention is to provide thermostatic control of the toasting period to maintain a substantially uniform degree of toasting for a given setting irrespective of whether the toasting operation is an isolated one or one of several closely successive operations.

In obtaining this object, the present invention utilizes a thermostat and it is a further object to subject the thermostat to approximately the same temperature as the toasting compartment during a portion of the cycle of operations.

A more specific object is to subject the thermostat, at least in part, to a substantially reduced temperature as soon as the toasting operation is completed and thereby facilitate the correct functioning of the thermostat during an ensuing operation.

In the preferred arrangement, the thermostat is positioned adjacent to an electric resistance heater and an end of the thermostat moves towards and away from the heater and into and out of the toasting compartment. It is a further object to prevent contact between the thermostat and the heater thus protecting each element from injury by the other.

A further specific object is to position the thermostat in the heating chamber while a timing mechanism which it controls is spaced from the heating chamber.

These and other detail objects of the invention as well appear from the following description are attained by the structure illustrated in the accompanying drawings in which:

Figure 1 is a top view of one end of a toaster and showing a thermostat and associated parts in horizontal section.

Figure 2 is a view taken approximately on line 2—2 of Figure 1 and shows the arrangement of a chamber partition and a thermostat associated therewith.

Figure 3 is a view taken approximately on line 3—3 of Figure 1 and indicating part of the timing unit and the associated thermostat control thereof when the device is cold.

Figure 4 is a similar illustration showing the thermostat control in a position assumed when heated.

The toaster comprises a housing 1, having transverse partitions 3 forming a plurality of toasting compartments 2, only one of which is shown, each having a pair of spaced plate-like electric resistance heaters H. A carrier 5 includes slice supports 5a movable vertically through the oven between each pair of heaters. The heater current is energized to begin a toasting period by closing the contacts of a switch 4 by downward movement of carrier 5 effected by manual downward movement of a handle 7. Carrier 5, while being lowered, engages a shoulder 10 on a winding bar 11 which is pivoted at 13 to a trip latch 12 and is connected to the escape movement of a clockwork mechanism C (Figure 3). Also, carrier 5 engages a hook 8 on a trip latch 12 to hold carrier 5 to winding bar 11 during upward movement, as described below. Further downward movement of carrier 5 forces bar 11 downwardly to wind the clockwork mechanism.

When handle 7 is released after being moved downwardly to its lower limit, carrier 5, winding bar 11, and trip latch 12 rise together slowly, as controlled by the clockwork escape mechanism, under the influence of a spring 9, biased to move carrier 5 upwardly to non-toasting position, until tail 14 of member 12 reaches the lower end of an arm 15 pivoted at 16 on an angle strip 17 secured to an inner wall 19 of the housing. Further upward movement of latch 12 and the associated parts causes rotation of the latch against tension of a spring 20, about its pivot 13 on bar 11, resulting in the disengagement of hook 8 and release of carrier 5 from winding bar 11, whereupon spring 9 immediately raises carrier 5 to its uppermost position (Figure 4). Obviously, the length of the toasting period is determined by the position of arm 15 as it engages tail 14 of latch 12, the sooner arm 15 engages tail 14, the shorter the toasting period.

Arm 15 is actuated by a bimetal thermostat 21 mounted indirectly upon partition 3, adjacent to an opening 22 therein. A spacer and heat conducting member 23, longer and wider than aperture 22, extends abreast thereof and its ends are secured to partition 3 beyond the ends of aperture 22, but its intermediate portion is offset from partition 3 towards heating element H. The offset portion is positioned alongside of heating element H and hence its temperature corresponds more closely to that of the heater than does the temperature of the partition or of the air in the toasting compartment. Thermostat 21 is secured at its inner end 24 to member 23. When bar 21 is cold, it assumes the substantially straight position at the inner side of partition 3 and against or close to member 23 as indicated in full lines in Figure 1. When the thermostat is heated, it deflects toward the broken line position, its free end moving through aperture 22 to the outer side of partition 3. The transverse partition 3 has horizontal flanges 25 adjacent the upper and lower portions of the partition and extending therefrom towards the heater. Flanges 25 slow the upward passage or hot air through the space between heater H and partition 3, and cooperate with plate 23 to cause the thermostat to respond rapidly to the temperature of the heating compartment.

As a substantial portion of thermostat 21 moves to the right through aperture 22 in partition 3 and outside of the heating compartment, it is subject to the temperature of the air in the space between partition 3 and the adjacent portion of housing 1 and the warmer the air in this space, the more rapidly thermostat bar 21 will move arm 15 to the right (Figure 4), and the shorter will be the toasting period. During the first few closely successive toasting operations initiated when the toaster is cold, the cool air in the space between the partition and the end of the toaster will check the movement of the thermostat to the right and prolong the toasting operation accordingly. Hence the thermostat tends to maintain a substantially uniform degree of toasting for a given setting irrespective of whether the toasting operation is an isolated one or one of several closely successive operations.

A flat spring 26 is secured at one end to the lower end of arm 15 and is connected at its upper end by a link 27 to an extension 28 on the movable end of thermostat 21. Spring 26 is stiff enough to move arm 15 in accordance with the movement of the swinging end of the thermostat unless movement of arm 15 is resisted by its engagement with tail 14, in which case spring 26 will yield to accommodate the deflection of the thermostat, as more fully explained and claimed in the parent application, Serial No. 486,641. A tension spring 31 tends to return arm 15 to the position shown in Figure 3.

The lower end of arm 15 is slotted to receive the upper portion of a clip 29 to guide the arm. The outer end of this clip is flanged at 30 to form a stop limiting movement of arm 15 to the right (Figure 4) so that it will not interfere with other adjacent toaster parts. If, due to carelessness, switch control failure, an intentional exhaustive test, or other unusual circumstances, the thermostat is subjected to such a high temperature that it tends to move beyond the position shown in full lines in Figure 4, such movement is accommodated by deflection of spring 26 after arm 15 engages flange 30. The yielding connection between thermostat bar 21 and arm 15 avoids the thermostat bar taking a permanent set as would result if there were no yielding connection. The above-mentioned patent application claims the structure just described.

The details of the construction may be varied substantially without departing from the spirit of the invention and the exclusive use of such modifications as come within the scope of the claims is contemplated.

What is claimed is:

1. In a toaster, a plate like heater, a partition closely associated with but spaced from said heater and forming a side of a toasting compartment, said partition having an elongated aperture, a strip extending abreast of and overlapping the boundaries of said aperture and positioned between said heater and said partition, a thermostat including an elongated bar secured at one end to said strip and being free at its other end to move to and from said strip into and out of said heating compartment through said aperture, the free end of said bar being adapted when cooled to lie near said strip and within said compartment and when heated to move away from said strip and outside of said compartment, and a timing mechanism controlled by said thermostat.

2. In a toaster having a timing mechanism, a plate like heater, a partition parallelling and spaced from said heater and forming a side of a toasting compartment and having an aperture, a spacer and heat conductor member carried by the partition and comprising a strip extending abreast of said aperture and offset from the partition and alongside the heater, a thermostat including a bar secured at one end to said strip and adapted when cooled to lie against said strip and within said compartment and when heated to move its other end away from said strip through said aperture and outside of said compartment, and a timing mechanism element controlled by the latter-mentioned end of the thermostat.

3. In a toaster having a thermostat controlled timing mechanism, a plate-like heater, a partition parallelling and spaced from said heater, and forming a side of a toasting compartment, there being an elongated aperture in said partition, a strip within the toasting compartment and adjacent said heater and parallelling said partition and extending abreast of said aperture and being wider and longer than the aperture, the thermostatic control including an elongated bar secured at one end to one end portion of said strip and having an extension at its other end projecting through said aperture, said bar being adapted when cooled to lie against said strip and within said compartment and when heated to move its free end away from said strip and outside of said compartment.

4. In a toaster having a thermostat controlled timing mechanism, a plate-like heater, a partition parallelling and spaced from said heater and forming a side of a toasting compartment, horizontal flanges adjacent the upper and lower portions of the partition and extending therefrom towards the heater, there being an elongated aperture in said partition, intermediate said flanges, a strip within said compartment and parallelling said partition and extending abreast of said aperture and being wider and longer than the aperture, the thermostatic control including an elongated bar secured at one end to one end portion of said strip and having an extension at its other end projecting through said aperture, said bar being adapted when cooled to lie against said strip and within said compartment and when heated to move away from said strip and outside of said compartment, said strip being positioned between said bar and said heater.

PAUL J. McCULLOUGH.

REFERENCES CITED

The following references are of record in the file of this patent:

UNITED STATES PATENTS

| Number | Name | Date |
|---|---|---|
| 2,112,422 | McCullough et al. | Mar. 29, 1938 |
| 2,201,456 | Sardeson | May 21, 1940 |
| 2,207,946 | Sardeson | July 16, 1940 |
| 2,237,146 | Ireland | Apr. 1, 1941 |